United States Patent [19]
Feierbach

[11] Patent Number: 6,128,186
[45] Date of Patent: Oct. 3, 2000

[54] ERGONOMIC COMPUTER WORKSTATIONS

[76] Inventor: Wolfgang R. Feierbach, Industriestrasse 6, D-63674 Altenstadt/Hessen, Germany

[21] Appl. No.: 09/153,263

[22] Filed: Sep. 14, 1998

[30] Foreign Application Priority Data

Jul. 17, 1998 [DE] Germany .......................... 198 32 338

[51] Int. Cl.[7] ............................ H05K 5/00; G06F 1/16; A47B 81/00
[52] U.S. Cl. ........................ 361/683; 361/681; 361/682; 361/683; 361/686; 361/724; 364/708.1; 312/223.3
[58] Field of Search ..................... 312/223.3; 361/683, 361/686, 681, 682, 724; 364/708.1

[56] References Cited

U.S. PATENT DOCUMENTS

| | | | |
|---|---|---|---|
| 5,021,763 | 6/1991 | Obear | 340/407 |
| 5,494,447 | 2/1996 | Zaidan | 439/31 |
| 5,548,478 | 8/1996 | Kumar . | |
| 5,651,594 | 7/1997 | Lechman | 312/194 |
| 5,815,364 | 9/1998 | Quesada | 361/686 |
| 5,825,614 | 10/1998 | Kim | 361/683 |
| 5,873,554 | 3/1999 | Nobuchi | 248/278.1 |

*Primary Examiner*—Leo P. Picard
*Assistant Examiner*—Tung Minh Bui
*Attorney, Agent, or Firm*—Knobbe, Martens, Olson & Bear, LLP

[57] ABSTRACT

An ergonomic workstation design is provided, incorporating an integrated flat screen monitor. Desirably, the monitor can be horizontally translated along tracks to adjust the relative position of the monitor for comfortable viewing. Furthermore, the disclosed flat screen monitor can be folded into a closed position where the viewing area is protected and the workstation is made more compact, while the desk area is clean and uncluttered. Moreover, compartments are provided for conveniently storing input devices such as keyboards when the workstation is not in use. Finally, the workstation is designed on several levels with hinged compartments openable for convenient service access.

17 Claims, 8 Drawing Sheets

ERGONOMIC COMPUTER WORKSTATIONS

FOREIGN APPLICATION PRIORITY DATA

This application takes priority from German Patent Application No. 198 32 338.7, filed Jul. 17, 1998.

FIELD OF THE INVENTION

The present invention relates generally to desktop computer workstations. In particular, the invention relates to ergonomic workstations incorporating flat screen monitors.

BACKGROUND OF THE INVENTION

In the early stages of the computer industry, workstations consisted of dumb terminals connected to a large main frame computer. The monitors of this era were mostly large, bulky, cathode ray tube (CRT) type monitors, with green or yellow phosphor displays. Realizing the eye strain caused by such phosphor displays, the industry eventually moved to a more tolerable display format, typically using black characters on a light blue background. Certain specialized applications, such as CAD and desktop publishing, also led to the development of particularized screen shapes and sizes (e.g., elongated screens to mimic pages and double-page displays).

The concern for the health of workers working full shifts on computer workstations carried through to other aspects of the workstation, such that a minimal ergonomic standard was established by default. Protecting the eye sight, posture, arms, and fingers of workstation users was recognized as being in the best interest of the employers, as it can lead to a more productive work force with greater longevity and less down time due to disability, such as carpal tunnel syndrome. As computer technology developed and became more accessible to smaller manufacturers, however, intense competition drove personal computer prices downward. Efforts to stay competitive by producing less expensive equipment have naturally led to de-emphasizing ergonomics and the health of the work force.

In general, today's personal computers can be categorized into desktop computers, laptops, and notebook computers. Desktop computers typically include processing and storage devices which are separately housed from the monitor and keyboard or other input devices (e.g., mouse). Tower computers typically have a rather large central processing unit (CPU) housing placed under the user's desk, whereas mini-tower CPU housings are placed on top of the desk. Desktop units also employ independent keyboards connected to the CPU by coiled wires, allowing some degree of freedom for placement of the keyboard relative to the rest of the computer. Ergonomic keyboards, such as the split keyboard provided by Microsoft Corporation, are also available. The monitors which come in standard desktop packages are usually 15" to 17" (measured diagonally from corner to corner), although some specialized monitors for publishing or design work can be larger (e.g., 19" to 21"), have double page screens, or specialized configurations to emulate the printed page.

Unlike desktops, the trend among laptop and notebook computers has been to integrate all input devices (e.g., keyboard and mouse or other pointer), storage devices, keyboard and monitor into one compact unit. The laptop incorporates liquid crystal display (LCD) or thin-film transistor (TFT) monitors, which are usually hinged at one end of the laptop. More recently, flat screen LCD monitors have also become available in larger sizes for standalone use in conjunction with desktop computers. As flat panel display technology continues to develop, future flat screen monitors promise to be brighter, quicker in response time, and have wider viewing angles.

Today's computers entail many disadvantages stemming from the history of computer development and conscious tradeoffs. For example, laptop computers sacrifice much in the way of ergonomics in exchange for portability. Generally speaking, the hinged flat screen on a laptop can only be adjusted relative to the keyboard by tilting it. This results in neck and/or eye strain. Either the keyboard is at an optimal position for typing, or the monitor is at an optimal position for viewing.

Similarly, while the individual components of desktop computers ostensibly provide the user some flexibility in placement and use, in reality these types of computers suffer from similar drawbacks. For example, a CRT placed on top of the CPU housing is generally too high for comfortable use all day. On the other hand, placing the monitor next to the CPU housing, in the manner mini-tower systems are usually employed, can occupy too much desk space and furthermore places the screen too low for comfortable use all day. Typical CRT monitors are also too bulky for convenient adjustment of positioning. Furthermore, the numerous cables external to the desktop housing can be both aesthetically displeasing and hazardous.

Accordingly, there is a need for an ergonomic workstation for comfortable and safe long-term use. Desirably, such a workstation should be geometrically flexible to accommodate different users or different postures of the same user. At the same time, such a workstation should be easily adaptable for upgrading or installing peripheral devices without creating the nuisance and hazard of multiple external cables.

SUMMARY OF THE INVENTION

In accordance with one aspect of the invention, a computer workstation is provided. The workstation includes a housing which contains electronic components such as a processor and a data storage device. A flat screen monitor is structurally attached to the housing and at the same time can be horizontally translated, relative to the housing, between a forward position and a rearward position.

In accordance with another aspect of the invention, a computer workstation includes a flat screen monitor and a computer housing. The monitor pivotally connects to the housing at a monitor hinge. The monitor hinge reciprocates within a track of the housing. At one position, the monitor can be pivoted. At other positions, the monitor is prohibited from pivoting. The housing includes at least three platforms which can pivot with respect to one another.

In accordance with another aspect of the invention, a method is provided for operating a computer workstation which incorporates a structurally attached flat screen monitor. The method includes pivoting the flat screen monitor from a closed position to an upright position. The monitor is then translated horizontally, relative to the housing.

BRIEF DESCRIPTION OF THE DRAWINGS

These aspects and others will be apparent to the skilled artisan from the following description and from the appended drawings, which are intended to illustrate and not to limit the invention, wherein.

DETAILED DESCRIPTION OF THE PREFERRED EMBODIMENT

Figure 1:
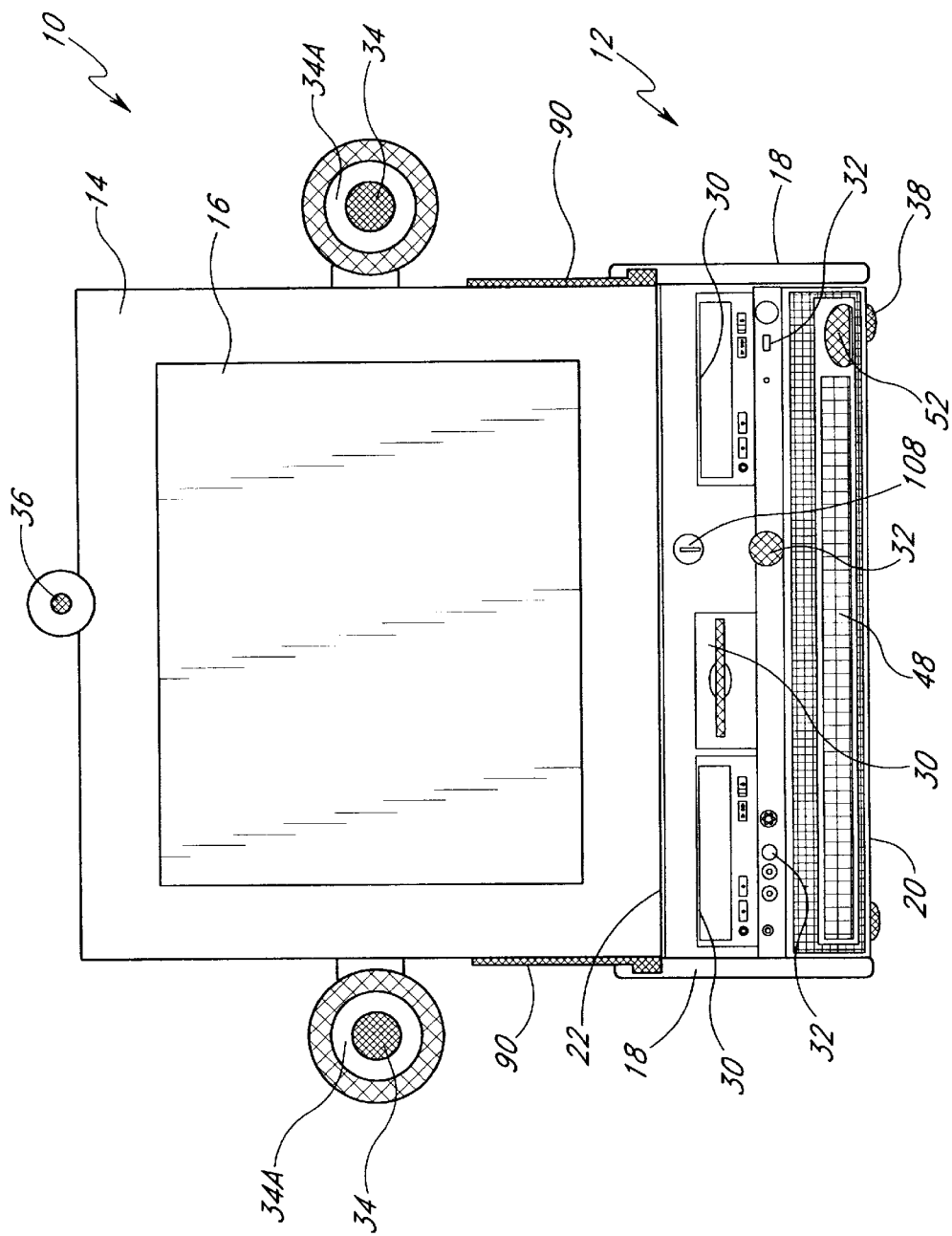
FIG. 1 is a front elevational view of a computer workstation, constructed in accordance with a preferred embodiment of the present invention, showing an integrated flat screen monitor in an unfolded mode.

Referring initially to FIG. 1, a computer workstation 10 is shown in accordance with a preferred embodiment of the invention. The workstation 10 comprises a computer housing 12 and a monitor 14 which has a relatively large viewing or display area 16. The monitor 14 comprises a high resolution flat screen display. Preferably, the display area 16 measures at least about 15" diagonally, and more preferably at least about 17". In an embodiment directed to design applications such as Autocad™, however, the display area 16 measures at least about 21".

The skilled artisan will understand that a "flat screen monitor" is one which does not employ a cathode ray tube (CRT), thus avoiding the bulk and weight of conventional desktop monitors. Currently, flat screen displays generally employ liquid crystal display (LCD) technology, though alternative flat screen technologies are rapidly being developed (e.g., field emission display or FED). Preferably, the monitor 14 has a thickness of less than about 4.0", more preferably less than about 2", and in the illustrated embodiment has a thickness of about 44 mm including the monitor frame.

Figure 2:
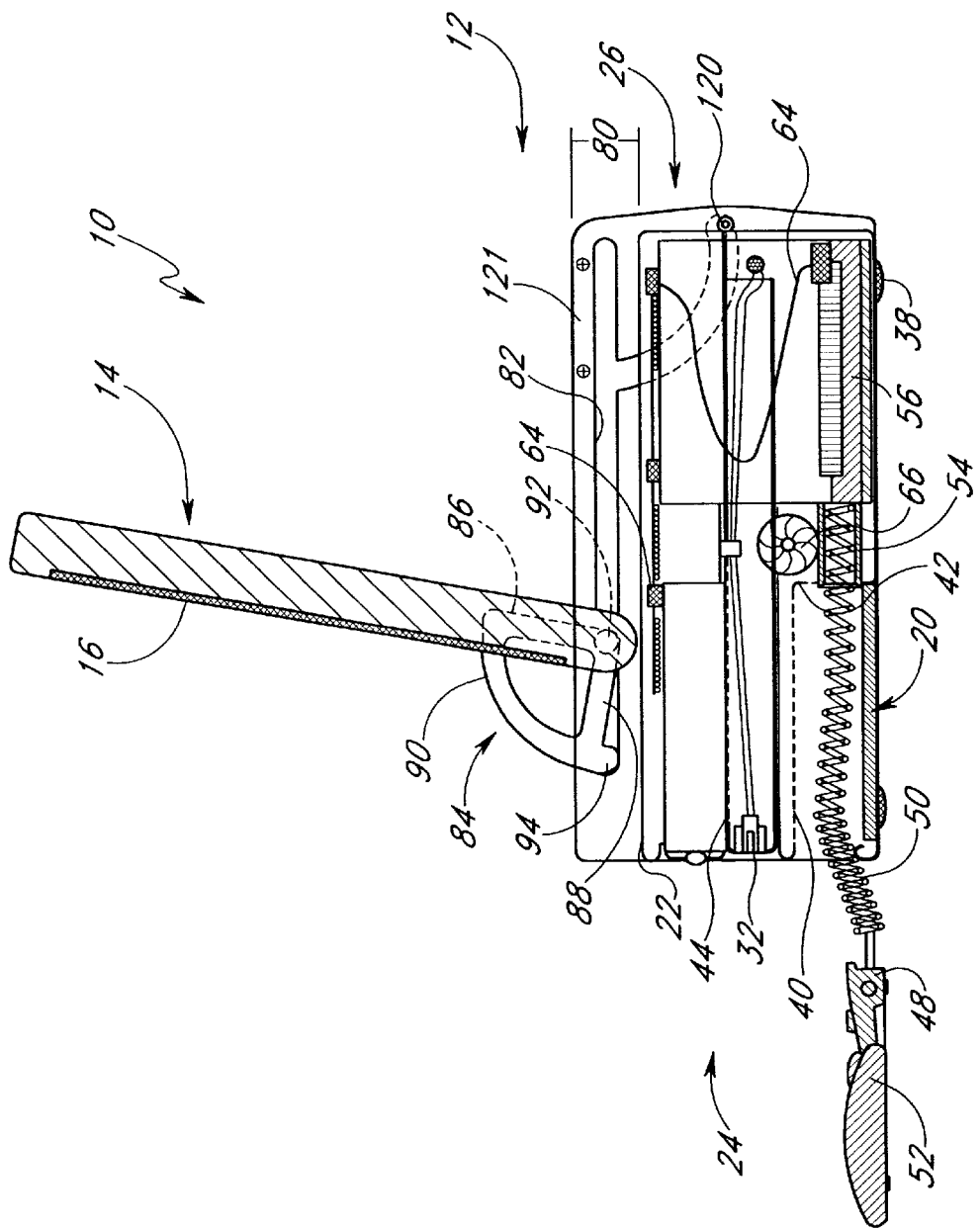
FIG. 2 is a side elevational cross section taken along lines 2—2 of FIG. 1.

The housing 12 is generally defined from right to left by a pair of side panels 18, from bottom to top by a housing bottom panel 20 and top panel 22, and from front to back by a housing front panel 24 and back panel 26 (FIG. 2).

The front panel 24 includes storage interface openings 30 for access to removable data or media storage devices such as CD, floppy, Zip™, Jazz™ and DVD drives. The front panel 24 preferably also includes smaller apertures 32 for device switches and auxiliary device communication ports. Such ports can include, for example, microphone or earphone jacks. The workstation on/off buttons, reset switches, and LED indicators are also visible or accessible through the apertures 32.

The illustrated embodiment includes optional multimedia components such as a pair of speakers 34 and a camera 36 for video conferencing. The speakers 34 preferably also include integrated lamps 34A for illuminating the user's face during video conferencing. Elastomeric pads 38 are attached to the bottom panel 20 in a conventional fashion to cushion and improve frictional grip between the workstation 10 and a supporting desk surface.

With reference now to FIG. 2, this cross-sectional view illustrates a plurality of internal platforms or partitions 40–44, which define a plurality of internal levels A–D. The partitions include a first partition or lower shelf 40, which serves as the ceiling for a keyboard compartment at a front portion of the first or lower level A. A vertical back wall 42 further defines the keyboard compartment. Desirably, each of the partitions 40 and 42 are air permeable or perforated to allow adequate ventilation from the remainder of the computer housing 12 to the outside atmosphere through the keyboard compartment. The front of the keyboard compartment is preferably kept open to facilitate such ventilation, as illustrated. It will be understood, however, that in other arrangements a hinged or sliding door can be provided to selectively close off the keyboard compartment.

The second or middle level B is defined between the first partition 40 and a second partition or upper shelf 44, while the third or upper level C is defined between the upper shelf 44 and the housing top panel 22. The level labeled D is defined by the top panel 22 and the portions of the side panels 18 extending above the top panel 22. As will be better understood in view of the description of the monitor movement below, level D includes the flat screen monitor 14 in its folded position (see, e.g., FIG. 3A).

As suggested by the name, the keyboard compartment defined by the partitions 40 and 42 is sized to accommodate input devices such as a keyboard 48. FIG. 2 shows the keyboard 48 in an extended position ready for use, connected through the back wall or vertical partition 42 to internal computer circuitry by way of a coiled keyboard wire 50. Preferably the keyboard 48 comprises a full-sized keyboard, with all standard function keys and a segregated numeric keypad. FIG. 2 similarly shows a mouse 52 in an extended position.

Figure 3A:
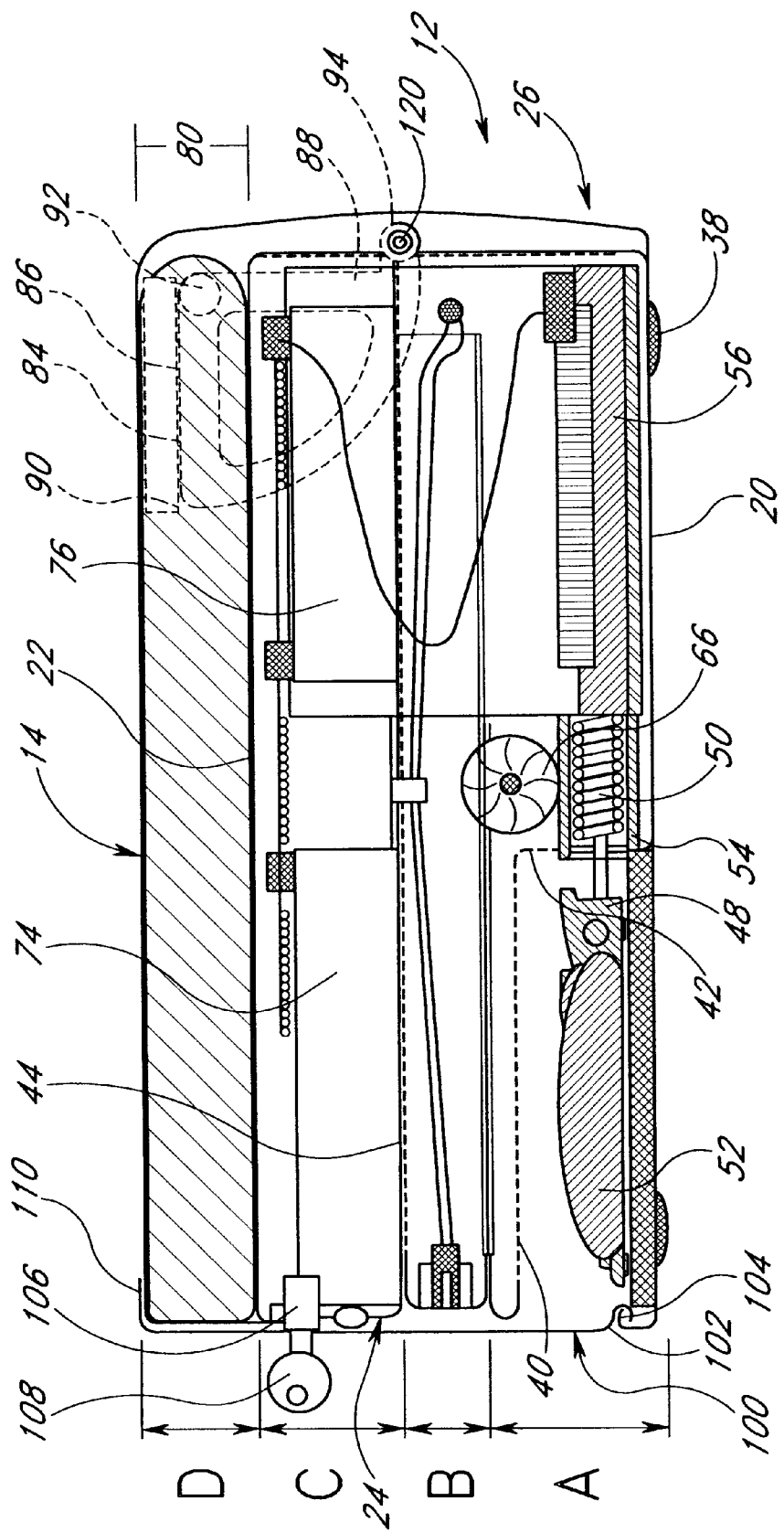
FIG. 3A is a side elevational cross section similar to that of FIG. 2, showing the flat screen monitor in a folded or closed mode.

FIG. 3A, on the other hand, shows the keyboard 48 and the mouse 52 berthed within the keyboard compartment in a shut-down or non-operational mode. Desirably, in the retracted position shown in FIG. 3A, the keyboard cable 50 coils into a plastic tube 54 to keep the cable 50 aligned and untangled. Preferably, the cable 50 is automatically retracted by a spring-loaded retraction device of conventional construction, such as those employed in many common household appliances. It will be understood that the keyboard compartment can also be configured to accommodate other input devices, such as touch pads, light pens or other pointers.

Figure 6:
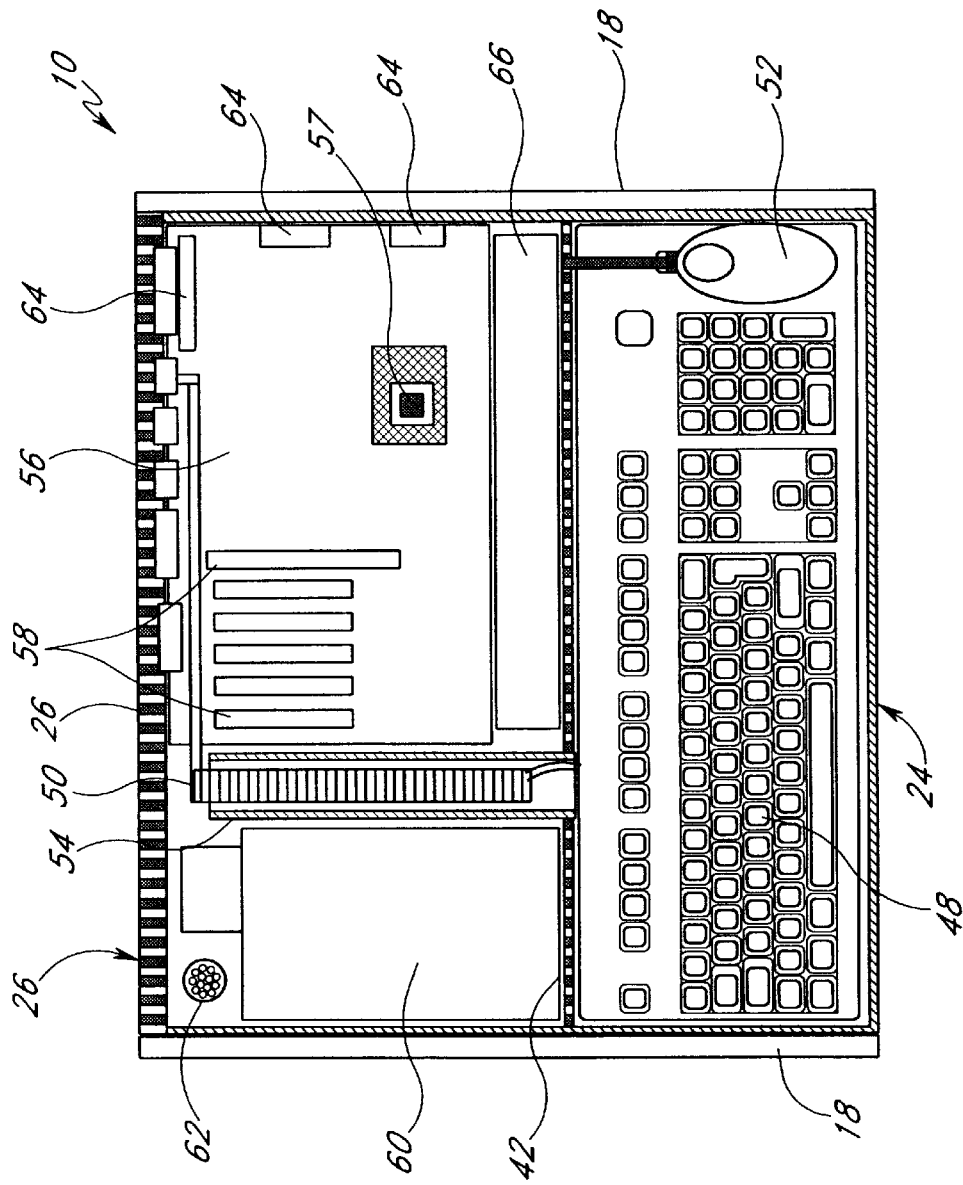
FIG. 6 is a top plan view of an open bottom compartment of the workstation housing.

As best seen from FIG. 6, level A also includes a plurality of electrical components behind the vertical partition 42. Preferably, these components include a mother board 56, which houses a microprocessor 57, memory chips, cable sockets, and other circuitry in a conventional fashion. A plurality of PC boards or cards 58 are vertically installed on the mother board 56 in a conventional fashion. Such cards can include network interface, sound or video cards, memory modules, device controller cards, modems, etc. A power supply 60 is located near the housing back panel 26. A cable tree 62 is also shown, extending upwardly to storage devices and the monitor in upper levels of the workstation 10. A plurality of sockets are also provided on the mother board 56 for bus lines 64, typically small computer system interface (SCSI) cables, which also extend to the upper levels.

The lower level A includes a ventilation fan 66, shown positioned between the mother board 56 and the vertical partition 42. Preferably, the back panel 26 is also perforated or slotted to allow adequate air flow through the workstation 10 and over the mother board 56.

Referring again to FIG. 2, the second level B is defined between the lower shelf 40 and the upper shelf 44. As illustrated, this space can accommodate wiring for communication ports 32 extending through the apertures on the front panel 24 (see FIG. 1). Either power or communication cables can also be distributed on level B to emerge through the upper shelf 44 at appropriate positions on the higher levels for connections to devices. Preferably, such wiring runs along the underside of the upper shelf 44, held in place by staples, brackets, and other such fasteners.

Figure 7:
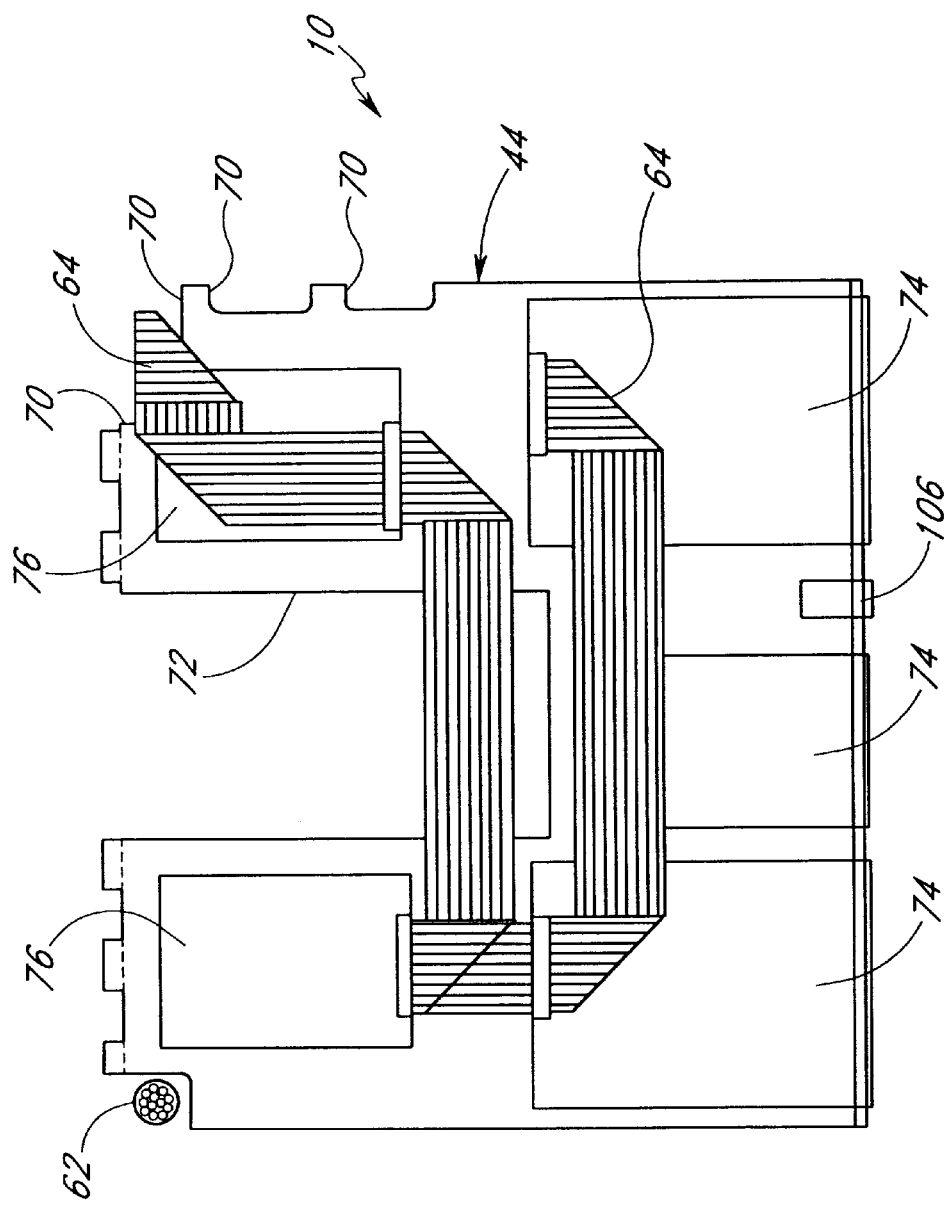
FIG. 7 is a top plan view of an open upper compartment of the workstation housing.

The layout of level C is best seen from the plan view of FIG. 7, which omits the housing panels. The upper shelf 44 defines the floor for level C, and includes several notches 70, preferably at the periphery of the shelf 44, which allow the passage of cables and wires between levels. The shelf 44 also includes a large central cutout 72 extending to the rear of the workstation 10. As will be understood by one of skill in the art, the cutout 72 accommodates the vertically installed PC cards 58, which can be seen from FIGS. 2 and 6.

The shelf 44 supports a plurality of electrical devices. In the illustrated embodiment, several input/output or storage devices 74, such as floppy, Zip™, Jazz™, read only or read/writable CD, or DVD devices, are stored toward the front of the workstation 10, extending through the storage interface apertures 30 in the front panel 24. Hard drives 76 or other devices which do not require frequent user access, are preferably positioned toward the rear part of the shelf 44. Ribbon wires 64 pass through the peripheral notches 70 and run on top of the devices 74 and 76.

With reference now to FIGS. 1–4, the flat screen monitor 14 is advantageously foldable between an open or unfolded position (FIGS. 1 and 2) and a closed or folded position (FIG. 3A). In the folded position, the monitor 14 acts as a cover or lid for the computer workstation 10. Additionally, the illustrated monitor 14 is adjustable relative to the workstation housing 12, as will be understood in light of the description below.

The housing side panels 18 extend above the housing top panel 22 to define a recess at the top of the housing 12. The portion of the side panels 18 extending above the housing top 22 shall be referred to as side rails 80 for convenience. The inside surface of each of the side rails 80 includes an elongated groove in the form of a horizontal gliding track 82.

The monitor 14 includes a handle 84 attached to the side frame of the monitor 14, extending therefrom on the same side as the viewing area 16, as best seen in FIG. 2. In the illustrated embodiment, the handle 84 comprises a first leg 86, bolted to the side of the monitor 14, a second leg 88, shown extending at right angles from the bottom of the first leg 86, and a third leg 90 joining the distal ends of the first and second legs 86, 88. In the illustrated embodiment, the third leg 90 is curved with a constant radius, and the three legs 86, 88, 90 define a convenient hollow through which the user can extend his or her hand and pull the monitor 14 towards him or her.

The handle 84 includes a first outwardly extending pin or peg 92 at the juncture of the first and second legs 86, 88, and a second outwardly extending pin or peg 94 preferably below the juncture of the second leg 88 and the third leg 90. The second peg 94 thus extends outwardly from a downward extension of the third leg 90 past the juncture with the second leg 88.

The outwardly extending pegs 92, 94 of each handle 84 extend into the gliding track 82 of one of the opposing side rails 80. In the unfolded operational position shown in FIG. 2, therefore, the monitor 14 can freely slide backward and forward until the distance of the display area 16 to the viewer's eye is comfortable. Conveniently, the opening defined by the handle 84 and the curvature of the third leg 90 allows the user to comfortably grip the handle 84 and move the monitor 14 back and forth to an appropriate position without having to grip the monitor 14 itself, thus avoiding fingerprints and other smudges on the display area 16 while also reducing the risk of damage from excessive handling of the screen 14.

As shown in FIG. 2, the monitor 14 is substantially vertical in an open or upright position, although the monitor 14 is preferably tilted slightly for a convenient viewing angle. In the illustrated embodiment, the screen 14 preferably is tilted at greater than 0° from the vertical, preferably between about 5° and 15°, and most preferably about 10°. As will be understood further from the following discussion of the holding mechanism, the screen tilt also aids in preventing the screen from accidentally closing as the user adjusts the horizontal position of the upright screen 14. In the illustrated embodiment, the angle of tilt is determined by the angle between the first leg 86 and a line drawn from the first peg 92 to the second peg 94. The skilled artisan will also appreciate, in light of the present disclosure, that the angle of tilt may be variable if a length-adjustable element is substituted for the third leg 90. In such an embodiment, the length adjustable member should include a locking feature to prevent accidental closure of collapse of the monitor 14. A damping mechanism can also be included to minimize damage to the monitor 14 in the event of accidental closure.

With reference now to FIG. 3A, the computer workstation 10 is illustrated in a shut-down or non-operational mode. As illustrated, the keyboard 48 is berthed within the keyboard compartment defined by the keyboard compartment ceiling 40 and the vertical partition 42. The mouse 52 is similarly berthed within the keyboard compartment. In arrangements which include a keyboard compartment door, for example, for portability, such a front door would also be closed in this mode. The monitor 14 is also folded in this position, with the display area face down over the housing top panel 22. The flat screen monitor 14 is thus housed within the recess defined by the side rails 80.

Figure 4:
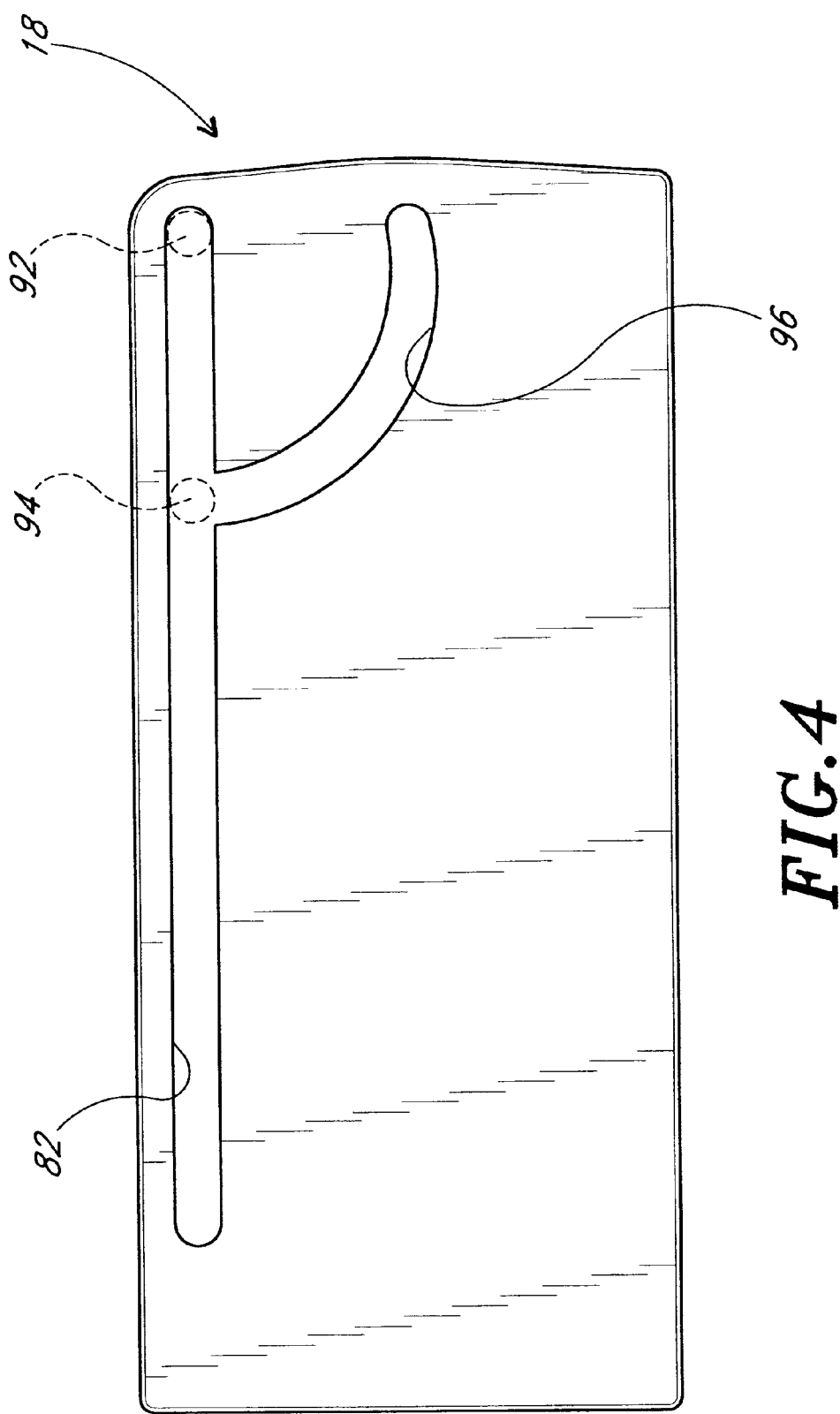
FIG. 4 is an elevational view of the inside surface of a workstation housing side panel, illustrating a gliding track recess in accordance with the preferred embodiment.

A method of closing the flat screen monitor 14 will be apparent from an inspection of FIGS. 2 and 4. As will be understood from FIG. 2, by grasping the handles 84 on either side of the screen 14, the user can horizontally translate the screen 14 backwards and forwards with pegs 92, 94 gliding within the tracks 82 of each side panel 18. Desirably, power and communication wiring between the monitor 14 and the electronics within the housing flexibly curves in the manner of wiring for a printer carrier, either within or outside the housing 12, as the monitor 14 is horizontally translated. At the same time, this wiring can follow the monitor 14 through a slot in the top panel 22, thereby avoiding unsightly cables protruding from the housing 14, and also minimizing cable interference with the horizontal translation.

In sliding the monitor 14 rearwardly, when the first peg 92 reaches the rear-most portion of the track 82, the second peg 94 will be aligned with a track branch 96, as shown in FIG. 4. In this position, with the screen 14 still upright and slightly tilted toward the rear, the tilting of the frame biases the peg 94 upwardly such that it does not fall into the track branch 96. However, a user can easily swing the monitor 14 forwardly, such that the first peg 92 acts as a pivot while the second peg 94 enters the track branch 96 and is guided along the track branch 96 as the screen swings shut. This closed monitor 14 thus fills the fourth level D defined by the side rails 80 and the top panel 22, in the position shown in FIG.

3A. The track branch 96 has a curvature or radius equal to the distance between the first peg 92 and the second peg 94.

FIG. 3A also illustrates a locking panel 100 extending over the front housing panel 24. The panel 100 includes a lower crease 102, which can hook into a mating hook 104 along the front edge of the housing bottom panel 20. After hooking the crease 102 at the bottom front edge of the housing 12, the panel 100 is pivoted about the crease 102 until the panel 100 is flush with the housing front panel 24. A locking mechanism 106 extends into the housing 12 at level C, and a turn of a key 108 can latch the panel 100 to the housing 12. An upper flange 110 of the panel 100 keeps the monitor 14 in the closed position. The locking panel 100 thus enables locking of the monitor in a folded position to inhibit unauthorized user access, and also to facilitate carrying without accidentally opening the housing 12.

Figure 3B:
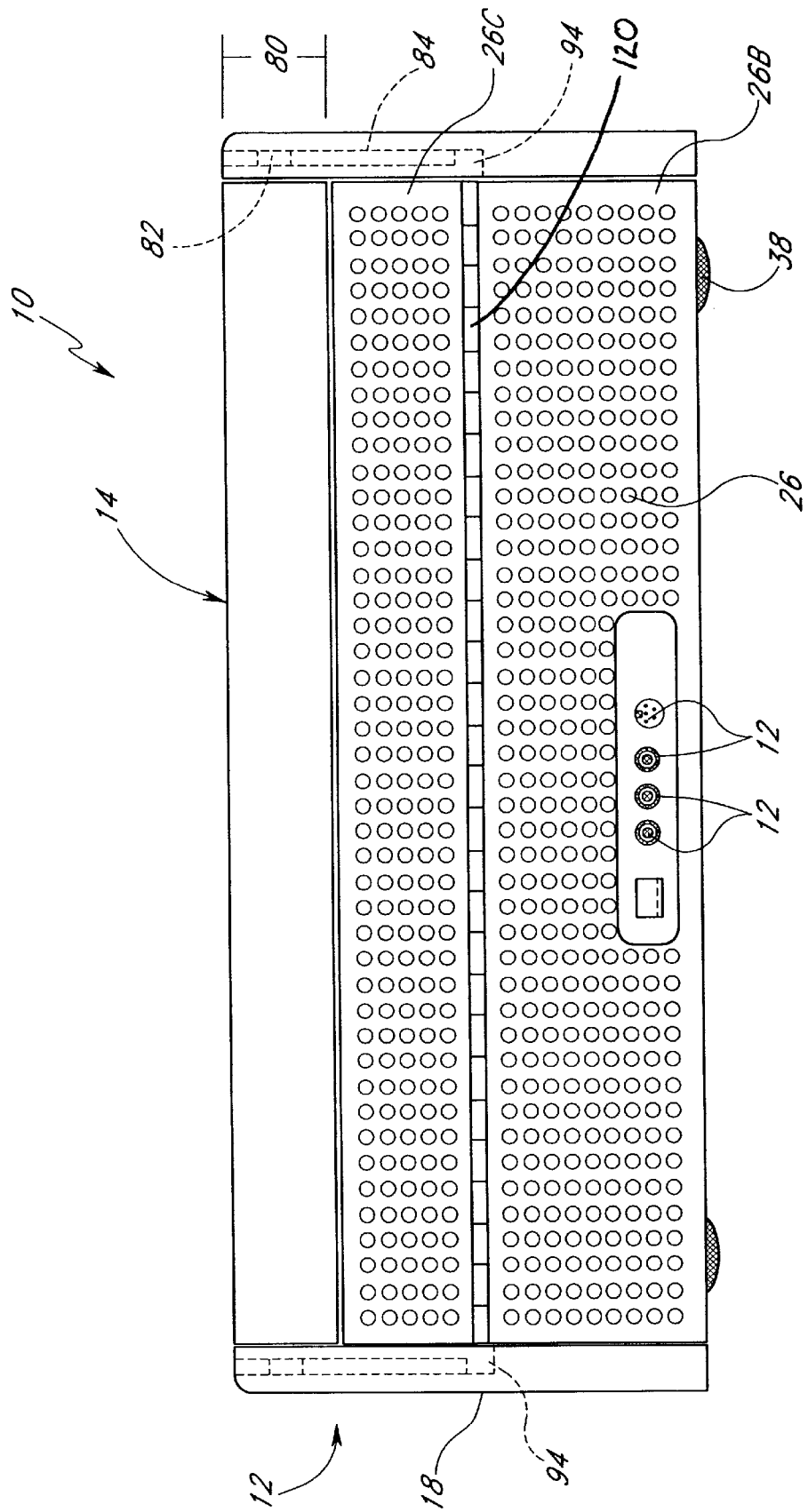
FIG. 3B is a rear elevational view of the workstation, showing the flat screen monitor in the folded or closed mode as in FIG. 3A.

With reference now to FIG. 3B, the workstation housing 12 is desirably pivotable across the back about a hinge 120, and therefore openable for convenient access to the components on the various levels A to D described above. The perforated back or rear panel 26 thus comprises a lower back panel portion 26AB, extending the height of levels A and B below the hinge 120. Rear ports 121, for power and communication cables (e.g., ethernet, modem, printer, etc.), extend through this lower portion 26AB. Notably, the back panel 26 does not include ports for input devices such as the keyboard 48 and mouse 52, which are advantageously connected internally through the vertical partition 42 (see FIG. 3A). The back panel 26 also includes a top back panel portion 26C, extending the height of the level C.

Figure 5:
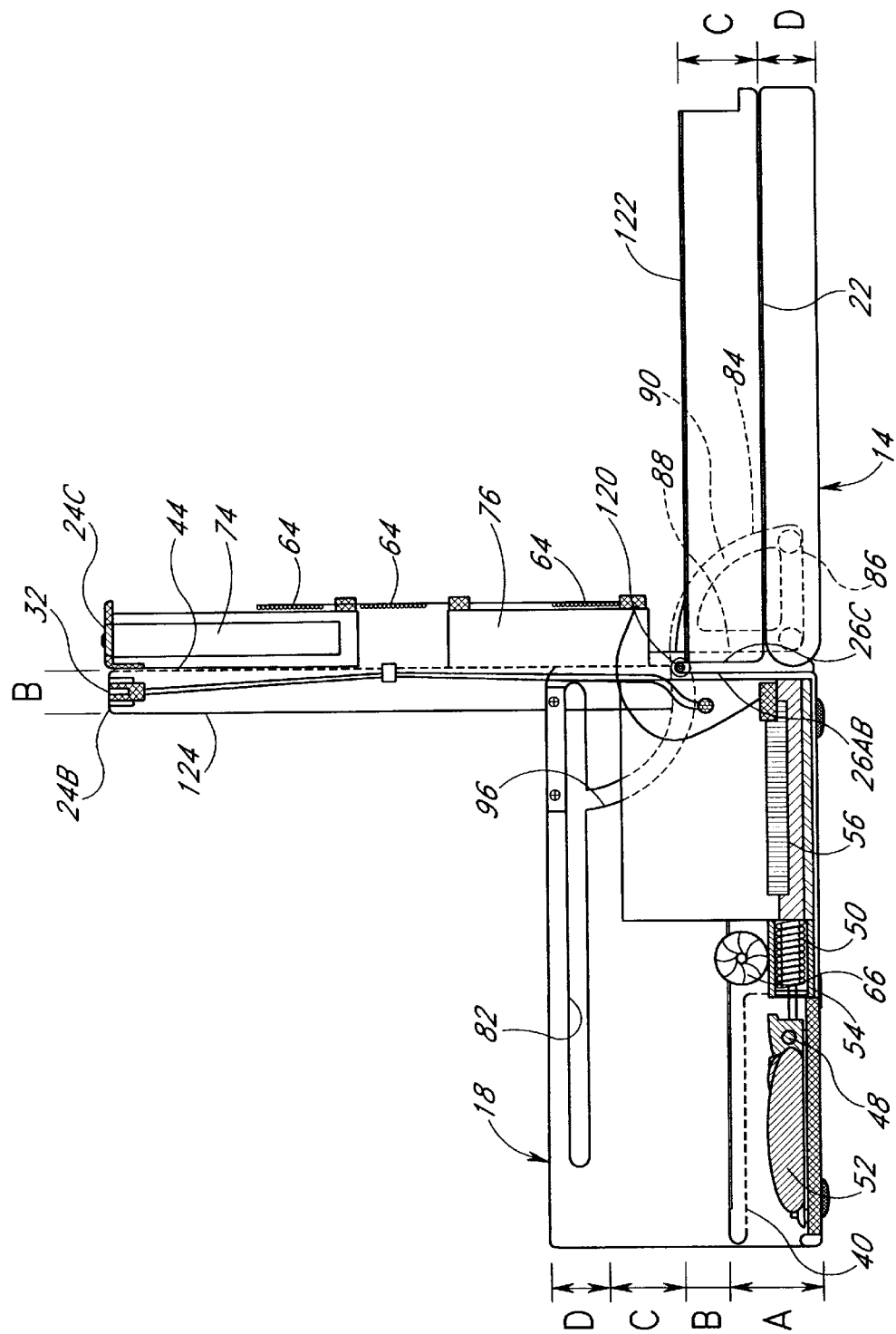
FIG. 5 is a cross-sectional view of the workstation in an open position, showing accessible levels of the workstation housing for servicing internal components.

Referring now to FIG. 5, the portions of the workstation 10 defining levels B, C and D can swing open in two separate stages about the same hinge 120. In particular, the portions of the housing 12 surrounding levels C and D pivot about the hinge 120 relative to the side panels 18, which remain in fixed relation to the housing bottom 20. The monitor 14 is first folded face down onto the housing top panel 22. A separable bar 121 of each side rail 80, which keeps the corresponding first peg 92 within the track 82 during normal operation, can be removed by the service provider (e.g. by removal of attachment bolds or screws).

With the bars 121 on either side panel 18 removed, the first pegs 92 are no longer confined to the track 82. The monitor and top panel 22 can then pivot about the hinge 120, while the second peg 94 of the handle 84 journals within the terminus of the branch track 96 about the same pivot axis as the hinge 120. The top panel 22 is preferably integral with level C side walls 122, which are spaced to fit between the housing side panels 18 when the workstation 10 is closed. In the upside-down position shown in FIG. 5, therefore, the housing portions of level C define an upwardly open trough or channel.

The second shelf 44 also pivots independently about the same hinge 120. In the illustrated embodiment, the devices of level C and the wiring of level B are fixed on either side of the second shelf 44. The integral level C portion 26C of the housing back 26 pivots with the second shelf 44, as does a level C portion 24C of the housing front panel 24. As illustrated, the second shelf 44 is preferably integral with a level B portion 24B of the housing front panel 24, including the communication ports 32. The second shelf 44 is preferably also integral with level B side walls 124, spaced to fit between the housing side panels 18 when the workstation 10 is closed.

While the devices 74, 76 of the illustrated embodiment are fixed to the middle shelf 44, it will be understood that, in other arrangements, the storage devices can be fixed to the top panel. Similarly, the level C front panel portion and/or the level C back panel portion can be formed integral with either of the top panel or middle shelf. Preferably, the walls through which devices are accessed are fixed with respect to the devices. In the illustrated embodiment, however, the input/output devices 74 and level C front panel portion 24C (having interface openings 30 therein) are integrally formed with and pivot with the second shelf 44. The level C side walls can also be integral with the middle shelf, rather than with the top panel.

Accordingly, the workstation 10 is easily opened for servicing or upgrading components. For example, housing portions of level C and D (including the monitor 14) can be opened and laid flat on a desk top, as shown. It will be understood that, with the second shelf 44 in a closed position between the side panels 18, (pivoted counterclockwise relative to the position shown in FIG. 5), the devices 74, 76 of level C would be easily accessible on the left side of the open housing 12, as viewed in FIG. 5. Furthermore, the PC cards 58 would be accessible through the central opening 72 of the second shelf 44 (see FIG. 7).

Alternatively, with the second shelf pivoted completely clockwise around to join the housing portions of level C and D upside-down on the desk, the wiring of level B would be accessible. Additionally, the components on level A (with the exception of input devices below the first shelf 40) would be accessible in this position.

Advantageously, the illustrated embodiment provides an ergonomic computer workstation wherein the monitor 14 can be horizontally translated to a comfortable viewing position, relative to the workstation housing 12. During such translation, the monitor 14 reciprocates within the gliding tracks 82 in the side panels 18. In other arrangements, it will be understood that one or more grooves across the housing top panel can serve as the track. At the same time, the monitor 14 remains structurally attached to the housing 12, thus obviating separate, bulky anchoring structures required by standalone flat screen monitors for stability. In addition to the monitor flexibility for viewing distance, the workstation is desirably designed to afford the user convenient access to input/output devices (e.g., CD ROM) and communication ports (e.g., video and audio input jacks) at the front of the workstation. Furthermore, the illustrated housing 12 is conveniently designed for rapid and convenient access to internal circuitry for maintenance, repair or upgrading service.

Although the foregoing description has shown, described and pointed out the fundamental novel features of the invention in the context of a particular preferred embodiment, it will be understood that various omissions, substitutions, and changes in the form of the detail of the apparatus and method as illustrated as well as the uses thereof, may be made by those skilled in the art, without departing from the spirit of the present invention. Consequently, the scope of the present invention is not intended to be limited to the foregoing discussions, but is instead defined by the appended claims.

I claim:

1. A computer workstation comprising:
   a housing containing electronic components including a processor and at least one data storage device, the housing comprising two parallel side panels each having at least one elongated groove therein; and
   a flat screen monitor structurally attached to the housing, the monitor horizontally translatable relative to the housing between a forward position and a rearward position, each side of the monitor comprising at least one peg extending into one of the grooves, the pegs reciprocating within the grooves as the monitor is horizontally translated, wherein each of the pegs is connected to a member extending outwardly from the monitor and each of the members comprises a pair of spaced pegs reciprocating within the at least one groove of the corresponding side panel as the monitor is horizontally translated.

2. The workstation of claim 1, wherein the member comprises a handle.

3. The workstation of claim 1, wherein the monitor pivots about one of the pegs in the rearward position.

4. The workstation of claim 1, wherein the grooves are formed on inside surfaces of the side panels and the pegs extend laterally from the monitor.

5. The workstation of claim 1, wherein the housing comprises a plurality of levels defined by a plurality of platforms extending between two side panels.

6. The workstation of claim 5, wherein at least three of the platforms are independently pivotable about a common hinge.

7. A computer workstation comprising:
   a housing containing electronic components including a processor and at least one data storage device, the housing comprising two parallel side panels each having at least one elongated groove therein and a branch groove extending away from the elongated groove; and
   a flat screen monitor structurally attached to the housing, the monitor horizontally translatable relative to the housing between a forward position and a rearward position, wherein each side of the monitor comprises at least one peg extending into one of the grooves, the pegs reciprocating within the grooves as the monitor is horizontally translated.

8. The workstation of claim 7, wherein each of the branch grooves extends downwardly and curves rearwardly from a juncture with the elongated groove.

9. The workstation of claim 7, wherein the monitor is foldable between an upright position and a closed position.

10. A computer workstation comprising:
    a housing containing electronic components including a processor and at least one data storage device, the housing comprising a plurality of levels defined by a plurality of platforms extending between two side panels, at least three of the platforms being independently pivotable about a common hinge positioned at about half the height of the workstation across a back wall of the housing; and
    a flat screen monitor structurally attached to the housing, the monitor horizontally translatable relative to the housing between a forward position and a rearward position.

11. A computer workstation comprising:
    a flat screen monitor;
    a housing pivotally connected to the flat screen monitor at a monitor hinge, the housing comprising:
      a track within which at least a portion of the monitor hinge reciprocates between a first position at which the monitor is pivotable and a plurality of non-pivoting positions; and
      at least three platforms pivotable with respect to one another, including a bottom housing panel, an intermediate shelf and a top housing panel, the top housing panel and the intermediate shelf being independently pivotable about a common housing hinge relative to the bottom housing panel.

12. The housing of claim 11, further comprising a keyboard berth beneath the intermediate shelf.

13. The housing of claim 11, wherein the track comprises a pair of recessed grooves each extending horizontally in an inner surface of a corresponding side panel.

14. A computer workstation comprising:
    a flat screen monitor;
    a housing pivotally connected to the flat screen monitor at a monitor hinge, the housing comprising:
      a track within which at least a portion of the monitor hinge reciprocates between a first position at which the monitor is pivotable and a plurality of non-pivoting positions; and
      at least three platforms pivotable with respect to one another, wherein a motherboard is mounted on one of the platforms, and at least one storage device is mounted on another of the platforms.

15. A computer workstation comprising:
    a flat screen monitor;
    a housing pivotally connected to the flat screen monitor at a monitor hinge, the housing comprising:
      a track within which at least a portion of the monitor hinge reciprocates between a first position at which the monitor is pivotable and a plurality of non-pivoting positions; and
      at least three platforms pivotable with respect to one another, wherein the at least three platforms are substantially parallel to one another and extend between two upright side walls.

16. A method of operating a computer workstation having a flat screen monitor structurally attached to a housing, the housing covering electronic components, the method comprising:
    pivoting the flat screen monitor from a closed position to an upright position, wherein pivoting comprises sliding a pair of opposed monitor first pegs in corresponding opposed curved branch tracks up to corresponding main tracks while pivoting a pair of opposed monitor second pegs in the corresponding main tracks; and
    translating the flat screen monitor horizontally relative to the housing.

17. The method of claim 16, wherein translating comprises sliding the first and second pegs in the main tracks.

* * * * *